US012692024B2

(12) United States Patent
Lachance et al.

(10) Patent No.: US 12,692,024 B2
(45) Date of Patent: Jul. 28, 2026

(54) AIRCRAFT ENGINE ASSEMBLY STAND

(71) Applicant: PRATT & WHITNEY CANADA CORP., Longueuil (CA)

(72) Inventors: Pierre-Luc Lachance, Brossard (CA); Roch Lamarre, St-Constant (CA); Maxime Patry, Saint-Amable (CA); Vishi Wijesinghe, Lethbridge (CA); Nathan Vollo, Lethbridge (CA); Scott Cameron, Lethbridge (CA); Cory Briscoe, Lethbridge (CA); Annie Rother, St-Hubert (CA); Matthew Dallas, Lethbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 41 days.

(21) Appl. No.: 18/757,726

(22) Filed: Jun. 28, 2024

(65) Prior Publication Data

US 2026/0001660 A1 Jan. 1, 2026

(51) Int. Cl.
| | |
|---|---|
| *F01D 25/28* | (2006.01) |
| *B64F 5/50* | (2017.01) |
| *F16M 1/04* | (2006.01) |
| *F16M 11/12* | (2006.01) |

(52) U.S. Cl.
CPC ................ B64F 5/50 (2017.01); F16M 1/04 (2013.01); F16M 11/125 (2013.01); F16M 2200/024 (2013.01)

(58) Field of Classification Search
CPC ........... B64F 5/50; F16M 1/04; F16M 11/125; F16M 2200/024
See application file for complete search history.

(56) References Cited

U.S. PATENT DOCUMENTS

| | | | | |
|---|---|---|---|---|
| 1,611,738 A | * | 12/1926 | Guilford | .................. B21D 1/12 269/283 |
| 2,703,252 A | | 3/1955 | Blackwell | |
| 4,010,942 A | * | 3/1977 | Ward | .................. B25H 1/0007 269/282 |
| 10,132,198 B2 | | 11/2018 | Baba et al. | |
| 11,052,533 B2 | | 7/2021 | Baucher et al. | |
| 2012/0223467 A1 | * | 9/2012 | Swan | ..................... B25B 11/02 269/37 |

(Continued)

FOREIGN PATENT DOCUMENTS

DE 102017220517 A1 5/2019

*Primary Examiner* — Amy J. Sterling
(74) *Attorney, Agent, or Firm* — NORTON ROSE FULBRIGHT CANADA LLP

(57) ABSTRACT

An aircraft engine stand for supporting an aircraft engine, has: a support; a mount rotatably mounted to the support, the mount extending around a central axis from a first end to a second end, the mount surrounding an engine-receiving space having an opening between the first end and the second end, the opening sized for allowing the aircraft engine to be positioned into and removed from the engine-receiving space, the mount rotatable relative to the support about the central axis and about a transverse axis intersecting the central axis; and an adaptor extending radially inwardly into the engine-receiving space relative to the central axis from a mounting interface removably secured to the mount to an engine interface removably securable to the aircraft engine.

17 Claims, 8 Drawing Sheets

(56)     References Cited

U.S. PATENT DOCUMENTS

| 2018/0311808 | A1 |   | 11/2018 | Baucher et al. |  |
| 2020/0255270 | A1 |   | 8/2020 | Cerovsky et al. |  |
| 2020/0290754 | A1 |   | 9/2020 | Chantal et al. |  |
| 2020/0347752 | A1 | * | 11/2020 | Porco | F01D 25/285 |
| 2023/0203965 | A1 |   | 6/2023 | Massicotte et al. |  |

\* cited by examiner

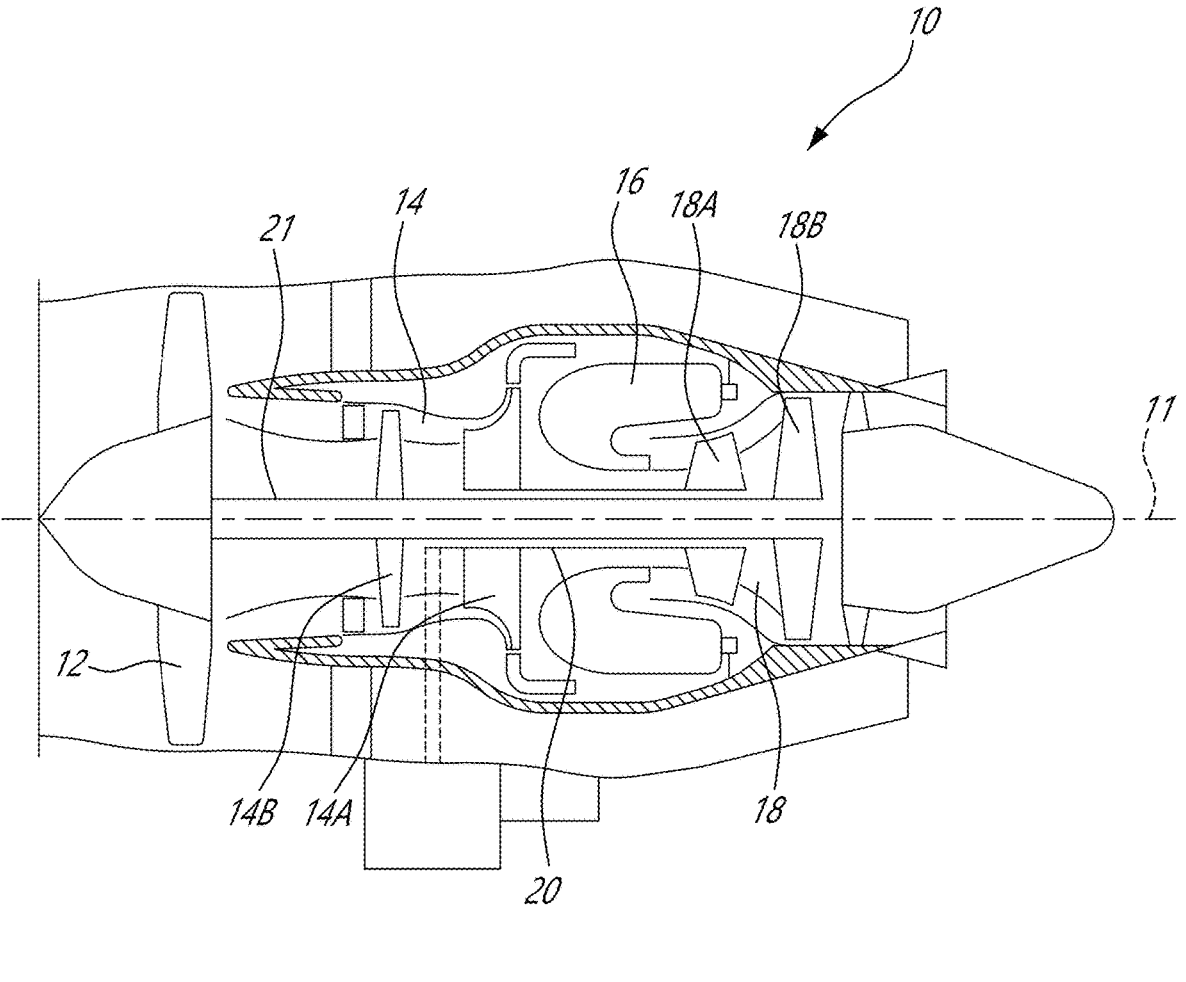
_FIG. 1_

100

120

D2

112

110

113

113

D1

D4

111

114

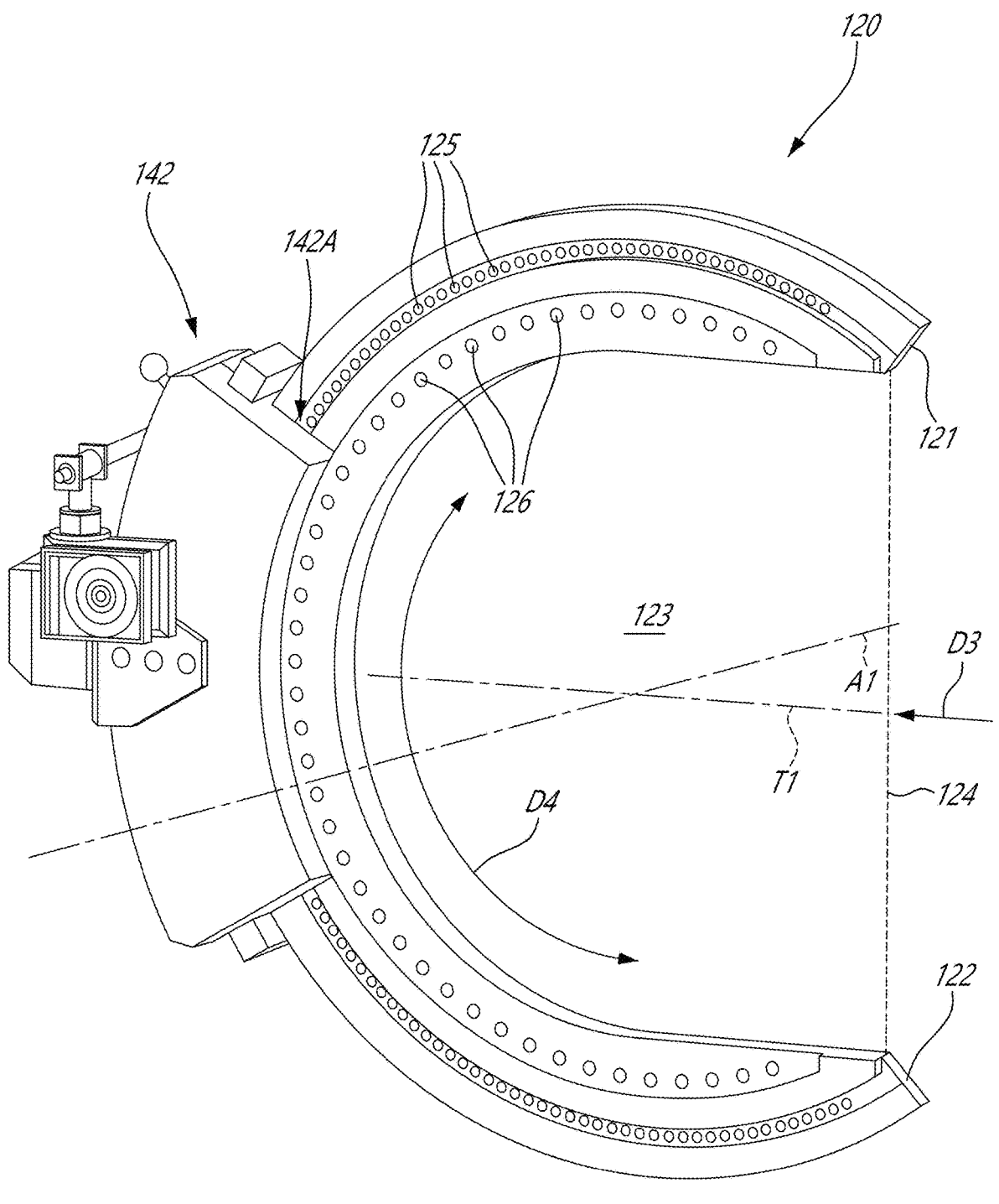
_FIG. 3_

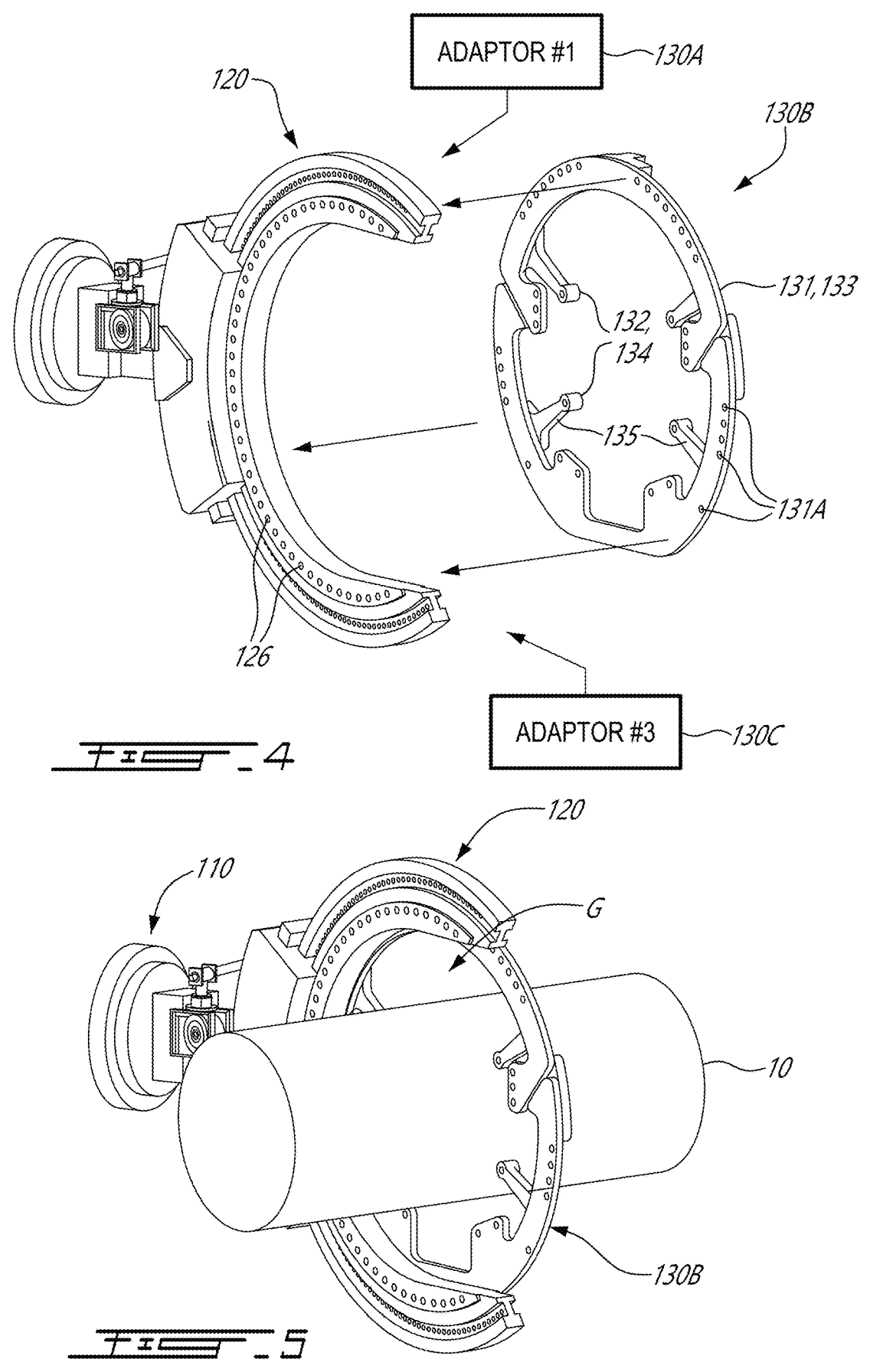

ADAPTOR #1 — *130A*

*120*

*130B*

*131,133*

*132, 134*

*135*

*131A*

*126*

ADAPTOR #3 — *130C*

$\_\_\_\_\_4$

*120*

*110*

*G*

*10*

*130B*

$\_\_\_\_\_5$

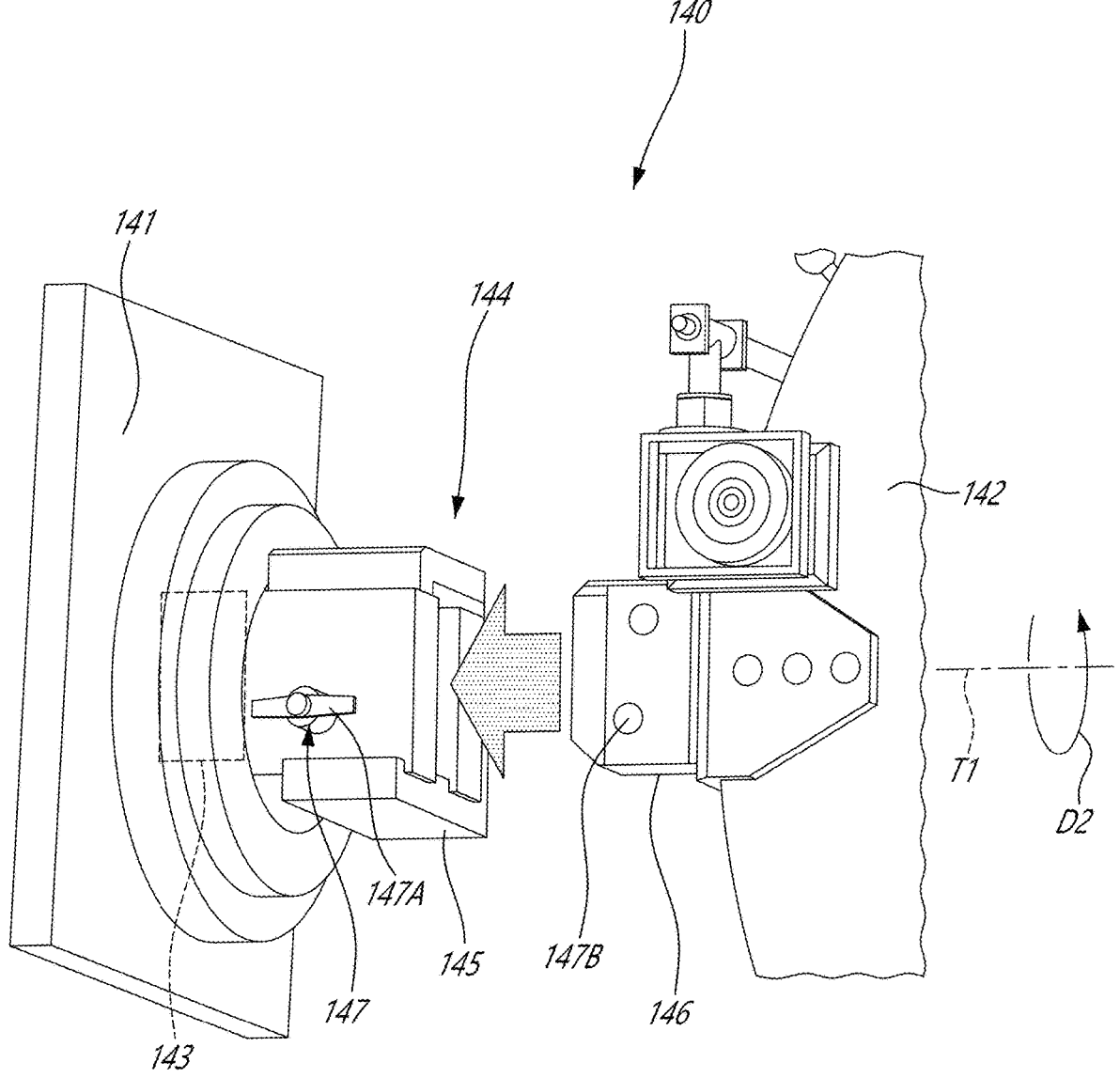
_FIG_6

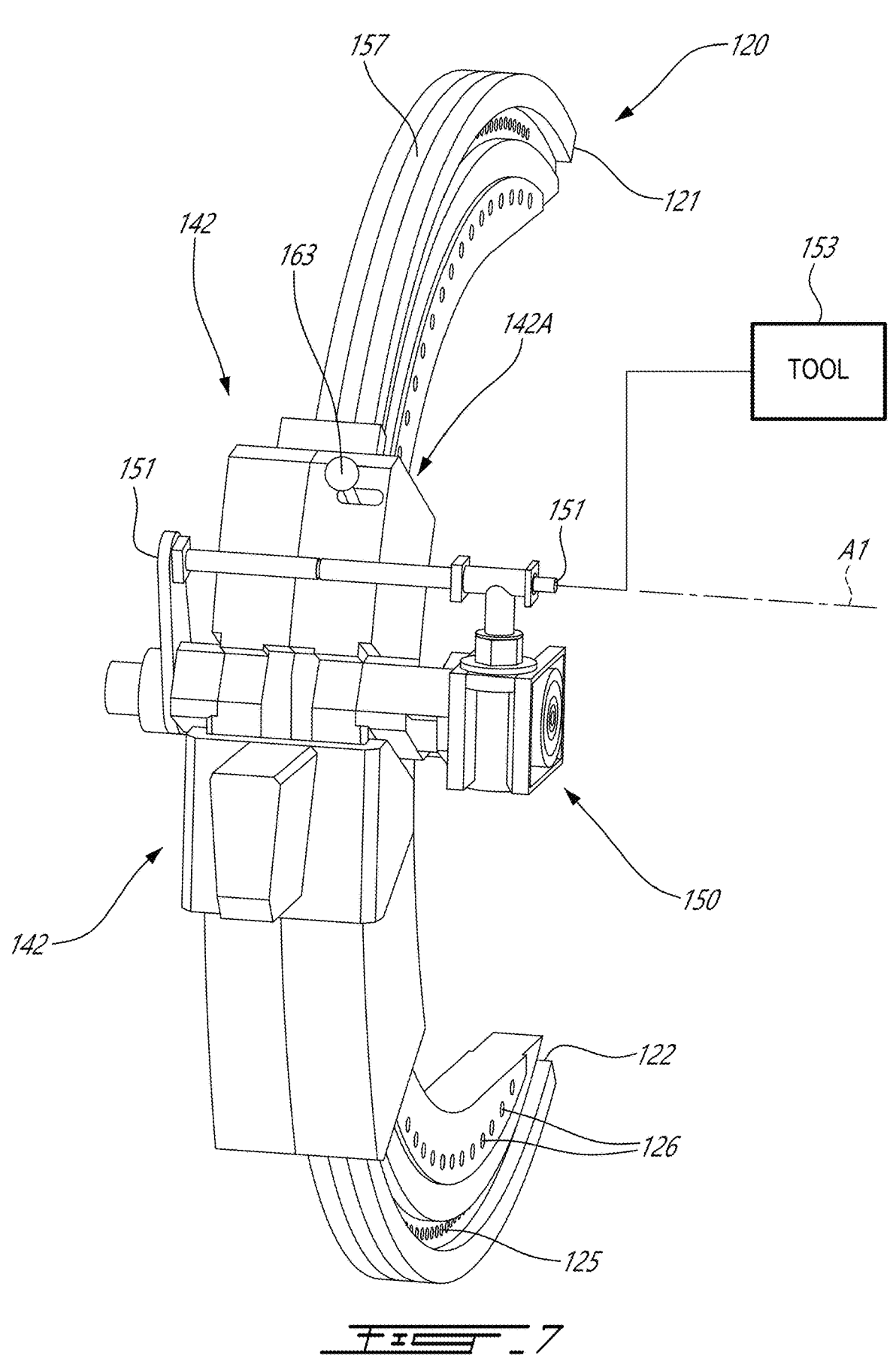
_FIG._7

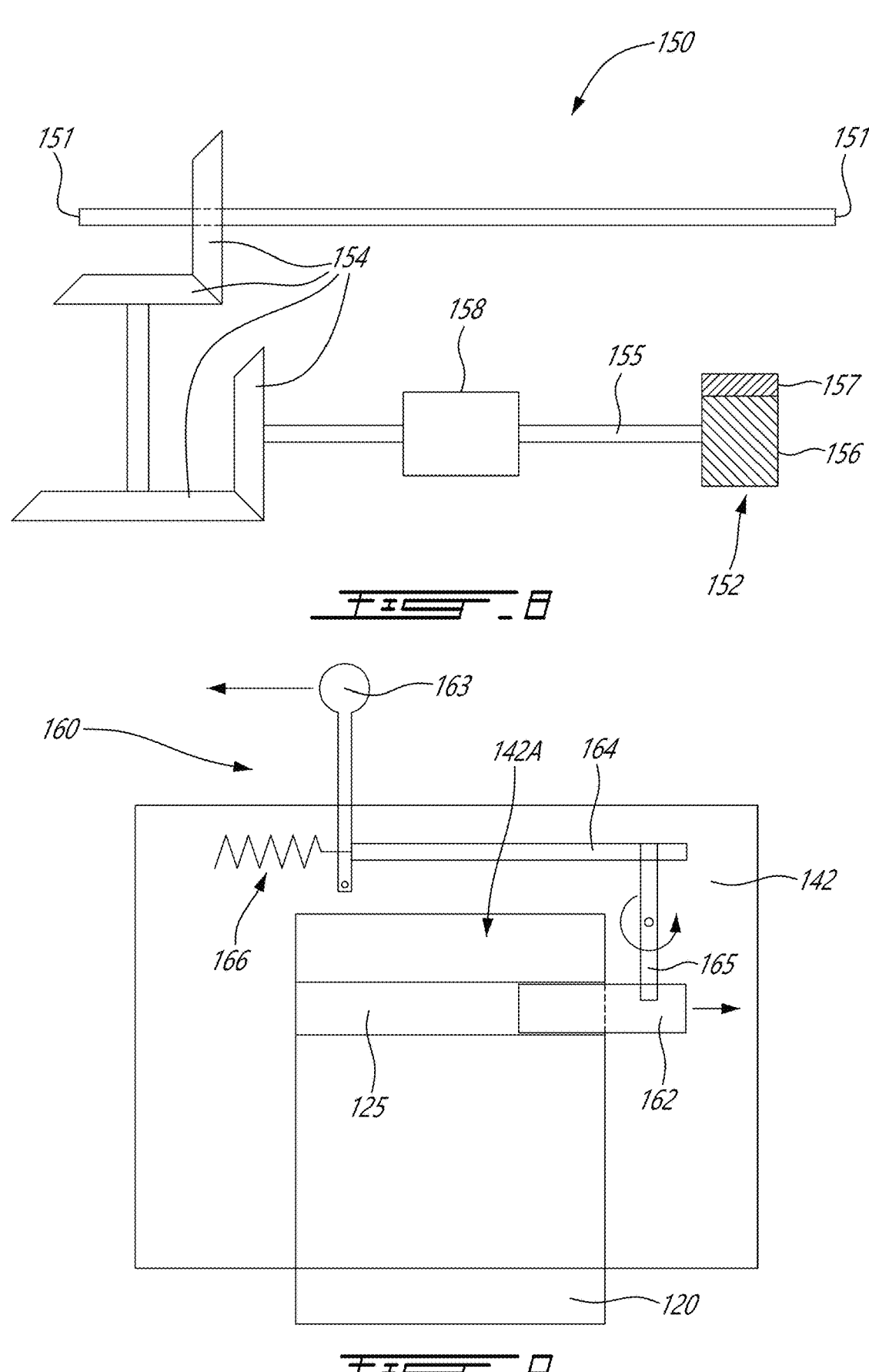

170
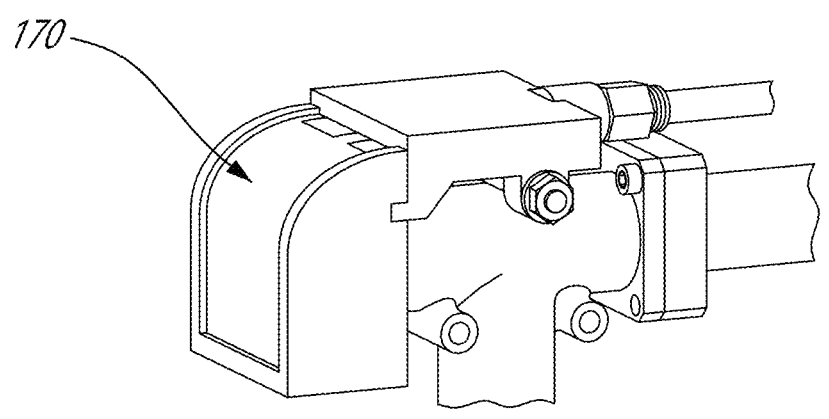
_FIG_10A
151
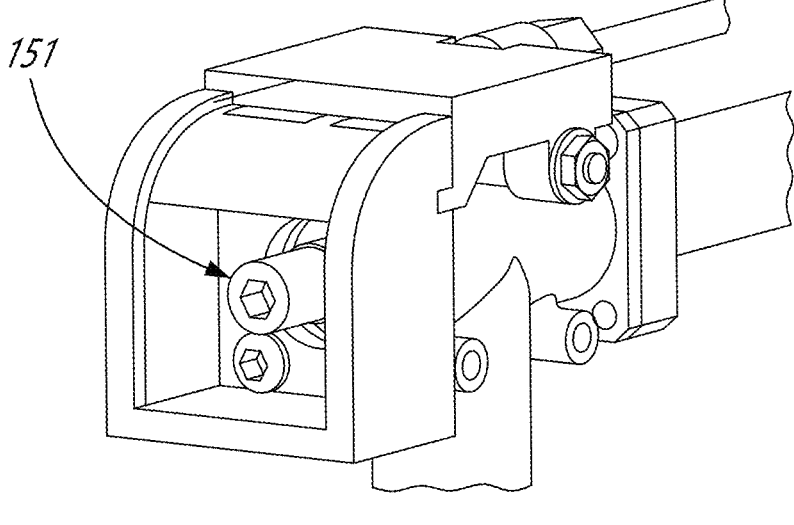
_FIG_10B

AIRCRAFT ENGINE ASSEMBLY STAND

TECHNICAL FIELD

The application relates generally to aircraft engines and, more particularly, to systems and methods of supporting the aircraft engines during assembly, disassembly, and maintenance operations.

BACKGROUND

Aircraft engines are built by assembling a plurality of components together, such as compressors, combustors, and turbines. These components are enclosed within casing sections secured to one another. Existing techniques to assemble the different components of such aircraft engines are satisfactory to some extend. However, improvements are always sought.

SUMMARY

In one aspect, there is provided an aircraft engine stand for supporting an aircraft engine, comprising: a support; a mount rotatably mounted to the support, the mount extending around a central axis from a first end to a second end, the mount surrounding an engine-receiving space having an opening between the first end and the second end, the opening sized for allowing the aircraft engine to be positioned into and removed from the engine-receiving space, the mount rotatable relative to the support about the central axis and about a transverse axis intersecting the central axis; and an adaptor extending radially inwardly into the engine-receiving space relative to the central axis from a mounting interface removably secured to the mount to an engine interface removably securable to the aircraft engine.

The aircraft engine stand described above may include any of the following features, in any combinations.

In some embodiments, the mount defines a plurality of apertures distributed around the central axis, the mounting interface including a mounting flange defining mounting apertures, the adaptor secured to the mount with fasteners received through the mounting apertures and through a subset of the plurality of apertures of the mount, the subset of the plurality of apertures of the mount in register with the mounting apertures of the adaptor.

In some embodiments, the mount is mounted to the support via a coupler, the coupler having: a coupler base secured to the support, and a coupler end rotatable relative to the coupler base about the transverse axis, the mount mounted to the coupler end.

In some embodiments, the coupler base is detachable from the coupler end.

In some embodiments, the coupler end defines a slot, the mount slidably received within the slot for rotation about the central axis.

In some embodiments, the mount defines locking apertures distributed around a periphery thereof, the coupler end lockable to the mount via a locking pin protruding from the coupler end and received within a selected one of the locking apertures.

In some embodiments, the coupler includes a transmission having an input drivingly engageable by a tool and an output engaged to the mount for rotating the mount relative to the coupler end about the central axis.

In some embodiments, the output is a sprocket, the sprocket being meshed with a belt, the belt extending around a periphery of the mount.

In some embodiments, the input includes two inputs each drivingly engageable to the output, each of the two inputs disposed on a respective one of opposite sides of the mount.

In some embodiments, the support includes a base and a bracket movable vertically relative to the base, the mount secured to the bracket.

In another aspect, there is provided an assembly, comprising: an aircraft engine; and a stand, the aircraft engine mounted to the stand, the stand having: a support; a mount rotatably mounted to the support, the mount extending around a central axis and surrounding an engine-receiving space, the mount defining a lateral opening communicating with the engine-receiving space along a direction transverse to the central axis, the lateral opening sized for receiving the aircraft engine, the mount rotatable relative to the support about the central axis and about a transversal axis normal to the central axis; and an adaptor, the aircraft engine secured to the mount via the adaptor, a gap defined between the aircraft engine and the mount, the adaptor extending across the gap, a portion of the gap being free of the adaptor.

The assembly described above may include any of the following features, in any combinations.

In some embodiments, the mount defines a plurality of apertures distributed around the central axis, the adaptor having a mounting flange defining mounting apertures, the adaptor secured to the mount with fasteners received through the mounting apertures and through a subset of the plurality of apertures being in register with the mounting apertures.

In some embodiments, the mount is mounted to the support via a coupler, the coupler having: a coupler base secured to the support, and a coupler end being rotatable relative to the coupler base about the transverse axis, the mount mounted to the coupler end.

In some embodiments, the coupler base is detachable from the coupler end.

In some embodiments, the coupler end defines a slot, the mount slidably received within the slot.

In some embodiments, the mount defines locking apertures distributed around a periphery thereof, the coupler end lockable to the mount via a locking pin protruding from the coupler end and received within a selected one of the locking apertures.

In some embodiments, the coupler includes a transmission having an input drivingly engageable by a tool and an output engaged to the mount for rotating the mount relative to the coupler end about the central axis.

In some embodiments, the output is a sprocket, the sprocket being meshed with a belt, the belt extending around a periphery of the mount.

In some embodiments, the input includes two inputs each drivingly engageable to the output, each of the two inputs disposed on a respective one of opposite sides of the mount.

In yet another aspect, there is provided an aircraft engine stand for supporting a variety of aircraft engines, comprising: a mount rotatably securable to a support, the mount extending around a central axis from a first end to a second end, the mount surrounding an engine-receiving space having an opening between the first end and the second end, the opening sized for allowing a selected one of the aircraft engines to be positioned into and removed from the engine-receiving space, the mount rotatable relative to the support about the central axis and about a transverse axis intersecting the central axis; and a set of adaptors selectively removably securable to the mount, the set of adaptors including a first adaptor and a second adaptor, the first adaptor configured to uniquely mate with a first configuration of the variety of aircraft engines, the second adaptor customized to uniquely mate with a second configuration of the variety of aircraft engines.

DESCRIPTION OF THE DRAWINGS

Reference is now made to the accompanying figures in which:

FIG. 1 is a schematic cross sectional view of an aircraft engine depicted as a gas turbine engine;

FIG. 3 is a perspective view of a mount of the stand of FIG. 2;

FIG. 4 is an exploded view showing the mount of FIG. 3 with different possible adaptors;

FIG. 5 illustrates the mount of FIG. 3 with an aircraft engine secured thereto via one of the adaptors illustrated in FIG. 4;

FIG. 6 is an exploded perspective view of a coupler of the stand of FIG. 2;

FIG. 7 is a rear three dimensional view of the mount of FIG. 2 illustrating a mechanism for rotating the mount;

FIG. 8 is a schematic view of a transmission of the mechanism of FIG. 7;

FIG. 9 is a schematic view of a locking system of the mechanism of FIG. 7;

FIG. 10A is a perspective view of a portion of the mount of FIG. 2 illustrating a safety door being in a closed configuration; and FIG. 10B is a perspective view of the portion of the mount of FIG. 2 illustrating the safety door in an open configuration.

DETAILED DESCRIPTION

Figure 2:
FIG. 2 is a perspective view of an aircraft engine assembly stand.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure turbine 18B of the turbine section 18 to a low-pressure compressor 14B of the compressor section 14 and drivingly engaged to the fan 12. It will be understood that the contents of the present disclosure may be applicable to any suitable engines, such as turbo-props and turboshafts, and reciprocating engines, such as piston and rotary engines, compounded engines including turbine and heat engine modules, and electric hybrid aircraft engines without departing from the scope of the present disclosure.

FIG. 2 shows an aircraft engine assembly stand, referred to simply as "stand" herein below, at 100. The stand 100 is configured for holding the gas turbine engine 10 during assembly/disassembly and/or maintenance operations. As will be seen hereinafter, the stand 100 is configured to rotate the gas turbine engine 10 along a plurality of axes to provide easy access to the different parts of the gas turbine engine 10. The stand 100 generally includes a support 110 and a mount 120 rotatably mounted to the support 110. These components are described one after the other herein below.

The support 110 includes a base 111 that may be supported on a ground surface.

Alternatively, the base 111 may be secured to a wall or to any suitable static structure. The base 111 further includes a bracket 112. As will be seen herein after, the mount 120 is releasably secured to the bracket 112 via a suitable connector, such as a quick connector. The bracket 112 is movable relative to the base 111 along a vertical direction D1 to vary an elevation of the gas turbine engine 10 relative to the ground. In the disclosed embodiment, the bracket 112 is engaged to the base 111 via rails 113. The support 110 may include an actuator 114, such as a hydraulic actuator, engaged to both of the base 111 and the bracket 112 and operable to move the bracket 112 along the vertical direction D1. Any other means for moving the bracket 112 relative to the base 111 are contemplated. For instance, the support 110 may include a motor drivingly engaged to sprocket meshed with a chain secured to the bracket 112. Rotation of the sprocket exerts a tension force on the chain thereby moving the bracket 112. A rack and pinion gear mechanism may alternatively be used. A pivotal engagement is provided between the mount 120 and the bracket 112 to allow a rotation D2 of the mount 120, and of the gas turbine engine 10 secured thereto, about an axis, which may be substantially perpendicular to the direction D1. In the context of the present disclosure, the expression "substantially", as in "substantially perpendicular" implies that some deviations from perfect perpendicularity caused, for instance, by manufacturing tolerances, is permissible.

Referring to FIG. 3, the mount 120 is described in more detail. In some embodiments, the mount 120 includes a C-shaped partially open ring extending circumferentially from a first end 121 to a second end 122 around an engine-receiving space 123. The mount 120 defines an opening 124 between the first end 121 and the second end 122. The opening 124, which may be referred to as a lateral opening, is sized for allowing an aircraft engine to be positioned into and removed from the engine-receiving space 123. In other words, the mount 120 extends around a central axis A1, which may be parallel, and in some cases coaxial to, the central axis 11 of the gas turbine engine 10 once the gas turbine engine 10 is installed inside the mount 120. The gas turbine engine 10 is receivable within the engine-receiving space 123 via the opening 124 and along a direction D3 being transverse to the central axis A1. In other words, the gas turbine engine 10 may be inserted into and removed from the engine-receiving space 123 by moving the engine along a transverse axis T1 intersecting (e.g., normal) the central axis A1.

As shown in FIG. 3, the mount 120 is rotatable about the central axis A1 along a direction D4. In some embodiments, the mount 120 defines locking apertures 125 distributed around a periphery of the mount 120 between the first end 121 and the second end 122. As will be seen hereinafter, these locking apertures 125 can be used in combination with lock pins or the like to releasably lock the mount 120 in a desired angular orientation around the central axis A1. Also, the mount 120 defines mounting apertures 126 distributed around the central axis A1 and between the first end 121 and the second end 122. The mounting apertures 126 offer different points of attachment for securing the engine to the mount 120. The mounting apertures 126 may be threaded in some embodiments. In this configuration, the array of locking apertures 125 are located radially outwardly of the array of mounting apertures 126 relative to the central axis A1, but the opposite is contemplated. The locking apertures 125 and the mounting apertures may be circumferentially distributed on concentric circles around the central axis A1.

Referring jointly to FIGS. 3-5, the mount 120 may be equipped with a selected one of a plurality of interchangeable adaptors, such as adaptors 130A, 130B, 130C schematically depicted in FIG. 3. Each of these adaptors is designed to mate with a respective engine. More specifically, the adaptors 130A, 130B, 130C are selectively removably securable to the mount 120. The set of adaptors 130A, 130B, 130C include, for instance, the first adaptor 130A, the second adaptor 130B, and the third adaptor 130C. More or less adaptors may be used in some embodiments. The first adaptor 130A is configured to uniquely mate with a first configuration of a variety of aircraft engines, the second adaptor 130B is customized to uniquely mate with a second configuration of the variety of aircraft engines, and the third adaptor 130C is configured to uniquely mate with a third configuration of the variety of aircraft engines. The expression "uniquely mate" implies that each of the adaptors may be able to mate with only a single one of the configurations of the variety of the aircraft engines. Thus, the first adaptor 130A may be incompatible with the second and third configurations of the variety of aircraft engines. More specifically, the first adaptor 130A may be configured to mount a turboprop engine to the mount 120 while the second adaptor 130B may be used to mount a turbofan engine, such as the gas turbine engine 10 of FIG. 1, to the mount 120. The third adaptor 130C may be used to secure an auxiliary power unit (APU) to the mount 120.

By using different adaptors, such as adaptors 130A, 130B, 130C, different types (e.g., models, classes or sizes) of engines can be installed on a same and unique universal mount, such as the exemplified mount 120. Indeed, the adaptors 130A, 130B, 130C may be individually designed to mate with a respective one of the plurality of aircraft engines while being releasably securable to the same mount 120. Therefore, using the mount 120 with another engine only requires substituting another adaptor for the adaptor already installed on the mount 120. This may greatly simplify operations performed on the gas turbine engine 10 and provide time and costs savings.

The description below focuses on the second exemplary adaptor 130B, but all of the adaptors may share similar features. The adaptor 130B includes a mount interface 131 and an engine interface 132 disposed radially inwardly of the mount interface 131. The mount interface 131 is used to secure the adaptor 130B to the mount 120 while the engine interface 132 is used to secure the gas turbine engine 10 to the adaptor 130B. In the depicted embodiment, the mount interface 131 is a mounting flange 133, which may have a ring shape for extending concentrically around the central axis A1. The mounting flange 133 defines a plurality of mounting apertures 131A. At least some of the mounting apertures 131A are configured to be in register with some of the mounting apertures 126 of the mount 120. Threaded fasteners, or pins, may be inserted into both of the mounting apertures 131A of the mount interface 131 (e.g., mounting flange 133) and the mounting apertures 126 of the mount 120 to secure the adaptor 130B to the mount 120. The engine interface 132 includes attachment points 134, four in this embodiment, but more or less is contemplated. Each of these attachment points 134 may be provided at ends of a respective one of stems 135 distributed around the central axis A1, secured to the mounting flange 133 and extending radially inwardly therefrom. Each of the attachment points 134 may be secured to a flange of the gas turbine engine 10 or any other suitable mounting features on the gas turbine engine 10. Therefore, the gas turbine engine 10 is secured to the mount 120 via the adaptor 130B. The gas turbine engine 10 may be free from direct connection to the mount 120. In other words, the gas turbine engine 10 may be secured to the mount 120 solely via the adaptor 130B.

It will be appreciated that the mount interface 131 need not be a full ring and may include, for instance, a ring segment securable to the mount 120. Similarly, the engine interface 132 may alternatively include a ring segment securable to a flange of the gas turbine engine 10. The adaptor may include an axially-protruding member being axially offset from the mounting flange 133 and configured to be fastened to a location on the gas turbine engine 10 being axially offset from the mount 120. A plurality of configurations are contemplated without departing from the scope of the present disclosure.

As shown in FIG. 5, the C-shaped body of the exemplified mount 120 has an inner diameter selected to be substantially greater than an outer diameter of the gas turbine engine 10. Once installed, the selected one of the set of removable adaptors extend across a gap G defined radially between the gas turbine engine 10 and the mount 120. The gap G is used to provide sufficient space all around the gas turbine engine 10 to technicians working on the gas turbine engine 10. Thus, a portion of the gap G is free of the adaptor. Hence, the mount 120 being oversized relative to the gas turbine engine 10 combined with the adaptors may provide the technicians with an ease of access to the gas turbine engine 10. This may facilitate assembly, disassembly, and maintenance operations performed on the gas turbine engine 10. The mount 120 needs not be C-shaped and may alternatively be U-shaped, for instance, and includes three sides transverse to one another. Any shape is contemplated as along as the mount defines an opening for receiving the gas turbine engine 10 along a direction transversal (e.g., normal) to the central axis 11 of the gas turbine engine 10. In the case where the mount 120 is not C-shaped, its diameter may be referred to as an "effective diameter" corresponding to a minimum distance between two points on the mount 120 being interconnected by a line that intersects a center of the mount 120. The effective diameter is selected to ensure sufficient working space and access to the gas turbine engine 10 around a full circumference of the gas turbine engine 10. Again, this may greatly facilitate the work of technicians working on the gas turbine engine 10.

Referring to FIG. 6, in some embodiments, the mount 120 is removably securable to the support 110 via a coupler 140. The coupler 140 includes a coupler base 141 secured to the support 110, herein to the bracket 112 of the support 110, and a coupler end 142 securable to the mount 142. The coupler end 142 is rotatable relative to the coupler base 141 about the transverse axis T1. A bearing, or any other suitable means, may be used to rollingly engage the coupler end 142 to the coupler base 141. The coupler 140 therefore permits rotation of the mount 120, and of the gas turbine engine 10 secured thereto, about the transverse axis T1 along the direction D2. A motor 143, or any suitable actuator, may be secured to one of the coupler base 141 and the coupler end 142 and drivingly engaged to the other of the coupler base 141 and the coupler end 142 to rotate the mount 120 about the transverse axis T1.

Still referring to FIG. 6, the coupler end 142 may be detachable from the coupler base 141. This function may be provided by a mechanism 144 including a female member 145 secured to the coupler base 141 and a male member 146 secured to the coupler end 142. The male member 146 receivable within the female member 145 to engage the coupler end 142 to the coupler base 141. A locking mechanism 147 may be used to lock the female member 145 to the male member 146. The locking mechanism 147 may include a pin 147A mounted to the female member 145 and engageable within a locking hole 147B defined by the male member 146. Understandably, any suitable mechanism for detachably securing the coupler end 142 to the coupler base 141 is contemplated. Similarly, any suitable locking mechanism for releasably securing the female member 145 to the male member 146 is contemplated. In alternate embodiment, the male member may be defined by the coupler base 141 and the female member may be defined by the coupler end 142.

Referring to FIGS. 7-8, in some embodiments, the coupler end 142 defines a slot 142A sized and configured for receiving the mount 120. The mount 120 is slidably received within the slot 142A such that the mount 120 is movable relative to the coupler end 142 about the central axis A1. In the embodiment shown, a transmission 150 is secured to the coupler end 142 to rotate the mount 120 about the central axis A1. The transmission 150 has an input 151 and an output 152 (FIG. 8) drivingly engaged to the mount 120 for rotating the mount 120 about the central axis A1. The input 151 is drivingly engageable by a tool 153, such as an electric drill, a wrench, and so on. In the embodiment shown, the input 151 includes two inputs disposed on opposite axial sides of the mount 120 relative to the central axis A1. This may allow the technician to rotate the gas turbine engine 10 secured to the mount 120 from both sides of said mount. Time savings may thus be provided.

As shown in FIG. 8, the transmission 150 of the present embodiment includes a plurality of gears 154 such as bevel gears, meshed with one another to transmit a rotation of the input 151 to a drive shaft 155. A sprocket 156, which defines the output 152 of the transmission 150, is drivingly engaged by the drive shaft 155 and engaged (e.g., meshed) to a belt 157, which may define teeth, mounted to and extending around the mount 120. The belt 157 may extend from the first end 121 to the second end 122 of the mount 120. Hence, inducing rotation of the input 151 with the tool 153 translates into rotation of the sprocket 156 which in turn induces pulls on the belt 157 thereby rotating the mount 120 relative to the coupler end 142 and about the central axis A1. In some embodiments, an anti-rotation clutch 158, such as a sprag clutch may be used to ensure that no torque is transferred from the mount 120, but only to the mount 120. The belt 157 may be replaced by a rack gear secured to a periphery of the mount 120.

As illustrated in FIGS. 7 and 9, a locking system 160 is used to lock the mount 120 to the coupler end 142 of the coupler 140 to prevent the mount 120, and the gas turbine engine 10 secured thereto, from rotating by itself. In the embodiment shown in FIG. 9, the locking system 160 includes a locking pin 162 receivable within one of the locking apertures 125 of the mount 120. The locking pin 162 is engaged to a lever 163 being hand-engageable by a user of the stand 100. The user may exert a force on the lever 163 along a direction depicted by the arrow of FIG. 9. The lever 163 therefore pulls on a first intermediate member 164, which itself induces rotation of a pivoting member 165 that in turn pulls the locking pin 162 out of the locking aperture 125 to permit rotation of the mount 120 relative to the coupler 140. A biasing member 166, such as a spring, may be used to bias the locking pin 162 into engagement with one of the locking apertures 125. Understandably, any suitable locking mechanism may be used. For instance, a solenoid may be used. Alternatively, the pin may be directly inserted into one of the locking apertures 125 by the user.

Referring now to FIGS. 10A and 10B, the input 151 of the transmission 150 may be covered by a safety door 170, which is shown in a closed position in FIG. 10A and in an open position in FIG. 10B. The input 151 is only accessible when the safety door 170 is in the open position. Moreover, the safety door 170 may be drivingly engaged to the lever 163 (FIG. 9) such that the lever 163 may be displaceable only when the safety door 170 is in the open position, and such that the input 151 may be activated only when the safety door 170 is in the open position. This may provide enhanced safety to the stand 100.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. The term "connected" or "coupled to" may therefore include both direct coupling (in which two elements that are coupled to each other contact each other) and indirect coupling (in which at least one additional element is located between the two elements).

It is further noted that various method or process steps for embodiments of the present disclosure are described in the preceding description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. The use of the indefinite article "a" as used herein with reference to a particular element is intended to encompass "one or more" such elements, and similarly the use of the definite article "the" in reference to a particular element is not intended to exclude the possibility that multiple of such elements may be present.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine stand for supporting an aircraft engine, comprising:

a support;

a mount rotatably mounted to the support, the mount extending around a central axis from a first end to a second end, the mount surrounding an engine-receiving space having an opening between the first end and the second end, the opening sized for allowing the aircraft engine to be positioned into and removed from the engine-receiving space, the mount rotatable relative to the support about the central axis and about a transverse axis intersecting the central axis the mount defining a plurality of apertures distributed around the central axis; and an adaptor extending radially inwardly into the engine-receiving space relative to the central axis from a mounting interface removably secured to the mount to an engine interface removably securable to the aircraft engine, the mounting interface including a mounting flange defining mounting apertures, wherein the adaptor is secured to the mount with fasteners received through the mounting apertures and through a subset of the plurality of apertures of the mount, the subset of the plurality of apertures of the mount in register with the mounting apertures of the adaptor.

2. The aircraft engine stand of claim 1, wherein the mount is mounted to the support via a coupler, the coupler having:

a coupler base secured to the support, and a coupler end rotatable relative to the coupler base about the transverse axis, the mount mounted to the coupler end.

3. The aircraft engine stand of claim 2, wherein the coupler base is detachable from the coupler end.

4. The aircraft engine stand of claim 3, wherein the coupler end defines a slot, the mount slidably received within the slot for rotation about the central axis.

5. The aircraft engine stand of claim 2, wherein the mount defines locking apertures distributed around a periphery thereof, the coupler end lockable to the mount via a locking pin protruding from the coupler end and received within a selected one of the locking apertures.

6. The aircraft engine stand of claim 2, wherein the coupler includes a transmission having an input drivingly engageable by a tool and an output engaged to the mount for rotating the mount relative to the coupler end about the central axis.

7. The aircraft engine stand of claim 6, wherein the output is a sprocket, the sprocket being meshed with a belt, the belt extending around a periphery of the mount.

8. The aircraft engine stand of claim 6, wherein the input includes two inputs each drivingly engageable to the output, each of the two inputs disposed on a respective one of opposite sides of the mount.

9. The aircraft engine stand of claim 1, wherein the support includes a base and a bracket movable vertically relative to the base, the mount secured to the bracket.

10. An assembly, comprising:

an aircraft engine; and a stand, the aircraft engine mounted to the stand, the stand having:

a support;

a mount rotatably mounted to the support, the mount extending around a central axis and surrounding an engine-receiving space, the mount defining a lateral opening communicating with the engine-receiving space along a direction transverse to the central axis, the lateral opening sized for receiving the aircraft engine, the mount rotatable relative to the support about the central axis and about a transversal axis normal to the central axis, the mount being mounted to other support via a coupler having a coupler base secured to the support, and a coupler end being rotatable relative to the coupler base about the transversal axis, the mount mounted to the coupler end; and an adaptor, the aircraft engine secured to the mount via the adaptor, a gap defined between the aircraft engine and the mount, the adaptor extending across the gap, a portion of the gap being free of the adaptor, wherein the coupler includes a transmission having an input drivingly engageable by a tool and an output engaged to the mount for rotating the mount relative to the coupler end about the central axis.

11. The assembly of claim 10, wherein the mount defines a plurality of apertures distributed around the central axis, the adaptor having a mounting flange defining mounting apertures, the adaptor secured to the mount with fasteners received through the mounting apertures and through a subset of the plurality of apertures being in register with the mounting apertures.

12. The assembly of claim 10, wherein the coupler base is detachable from the coupler end.

13. The assembly of claim 10, wherein the coupler end defines a slot, the mount slidably received within the slot.

14. The assembly of claim 10, wherein the mount defines locking apertures distributed around a periphery thereof, the coupler end lockable to the mount via a locking pin protruding from the coupler end and received within a selected one of the locking apertures.

15. The assembly of claim 10, wherein the output is a sprocket, the sprocket being meshed with a belt, the belt extending around a periphery of the mount.

16. The assembly of claim 10, wherein the input includes two inputs each drivingly engageable to the output, each of the two inputs disposed on a respective one of opposite sides of the mount.

17. An aircraft engine stand for supporting a variety of aircraft engines, comprising:

a mount rotatably securable to a support, the mount extending around a central axis from a first end to a second end, the mount surrounding an engine-receiving space having an opening between the first end and the second end, the opening sized for allowing a selected one of the aircraft engines to be positioned into and removed from the engine-receiving space, the mount rotatable relative to the support about the central axis and about a transverse axis intersecting the central axis; and a set of adaptors selectively removably securable to the mount, the set of adaptors including a first adaptor and a second adaptor, the first adaptor configured to uniquely mate with a first configuration of the variety of aircraft engines, the second adaptor customized to uniquely mate with a second configuration of the variety of aircraft engines.

* * * * *